May 4, 1948.  J. H. HILL  2,440,950
MACHINE FOR CUTTING WORK PIECES
Filed Aug. 4, 1945
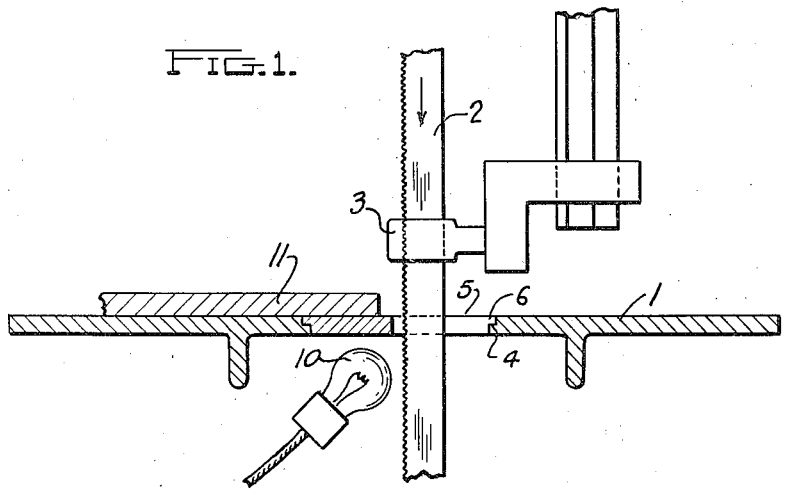
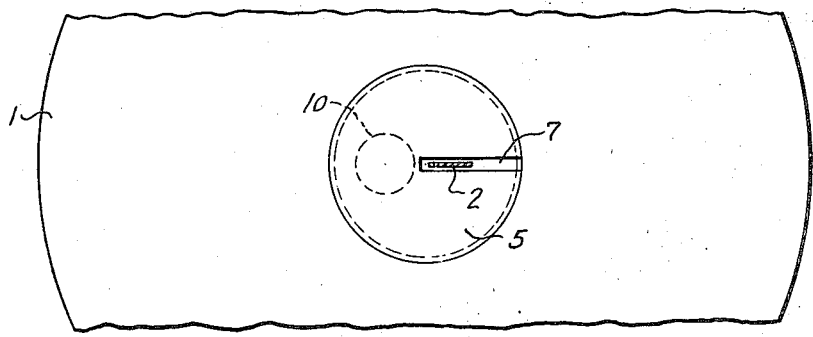
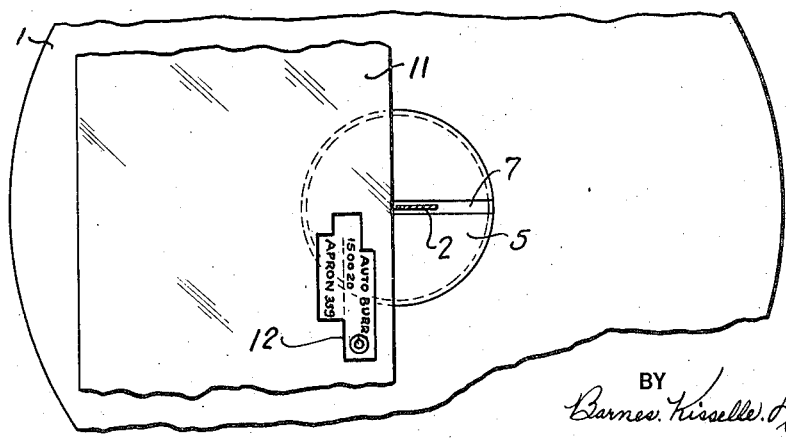
INVENTOR
John H. Hill
BY
Barnes, Kisselle, Laughlin & Raisch
ATTORNEY Patented May 4, 1948

2,440,950

UNITED STATES PATENT OFFICE 2,440,950

MACHINE FOR CUTTING WORK PIECES

John H. Hill, Mount Clemens, Mich.

Application August 4, 1945, Serial No. 608,942

3 Claims. (Cl. 164—35)

This invention relates to a machine for cutting work pieces from basic stock and it has to do particularly with a machine provided with a saw.

The invention is directed particularly to the provision of a machine for cutting devices such as templates representative of machines or items of equipment from translucent or transparent material and which are particularly useful in making plant layouts. In my application Serial No. 577,108, filed February 9, 1945, there is disclosed a plant layout system. A portion of this system comprises photographically reproducing a representation of a machine or other item of equipment on a sensitized film or surface, which surface is on a sheet of material of sufficient thickness so that it is self-shape retaining. A plurality of such photographic reproductions of various items of equipment may be made on a single relatively large sheet which has one surface sensitized for the purpose. These reproductions are greatly ensmalled so as to provide small representations of the machines or items of equipment and the various representations are then cut from the sheet and may be termed templates. A number of these templates are then used and are maneuvered over a diagram or drawing of the plant area or the like to arrive at and ascertain a suitable plant layout which facilitates production and provides room for the workmen, and also provides for the location of particular machines at places in the area so that the machines can be serviced with the equipment in the building or area such as water, steam, air, a drain, ventilation, and may be placed relative, if desired, to fire-fighting equipment and the like.

The transparent sheet of material, upon which the representations of the machines or items of equipment are photographically reproduced is preferably a suitable plastic such, for example, as "Lucite" and when the templates are cut therefrom they are translucent or transparent and each template may have provided thereon suitable indicia indicating the particular machine or type of machine and the services required and the like. The present invention provides a machine which may be termed a saw for cutting templates from the basic stock. In accordance with the invention the work table of the machine is provided with a table or support through which the saw blade extends and this table is provided with a transparent or translucent portion or segment immediately adjacent the cutting instrument while suitable light source means is located underneath this portion or segment. As a result, the light passes up through the transparent or translucent portion of the table of the machine and through the transparent or translucent work piece so that the operator can readily see both the outline of the form or template which is being cut and the edge of the cutting instrument and the relative positions of the two.

An apparatus constructed in accordance with the invention is disclosed in the accompanying drawings:

Fig. 1 is a general view in section illustrating a machine constructed in accordance with the invention.

Fig. 2 is a plan view of a portion of the table or support of the machine showing the cutting instrument in section and with the work piece removed.

Fig. 3 is a view similar to Fig. 2 showing the work piece in position.

As shown in Fig. 1, there is a machine provided with a suitable work table or support 1 through which extends a cutting instrument in the form of a saw blade 2. The table 1 is, of course, to be supported from the floor by a suitable standard or other supporting means (not shown) and the saw blade is suitably operated. If the blade is in the form of a band, such as the usual band saw, it may move over suitable pulleys or wheels (not shown) so that the portion which passes through the table 1 moves downwardly in the direction of the arrow shown in Fig. 1. The blade may have a suitable auxiliary guiding means 3 positioned above the table 1.

The central part of the table through which the blade extends is provided with a hole or an aperture designed to receive an insert which constitutes a portion of the table. The table 1 may be of suitable metal such as steel and the central hole is advantageously provided with an offset which affords a circumferential shoulder 4. Positioned in the aperture is the auxiliary translucent insert 5. If the aperture in the table is circular the insert 5 may be in the shape of a disc as shown in Fig. 2, and it is provided with a circumferentially enlarged shoulder 6 which seats upon the shoulder 4. Preferably the upper surface of the insert 5 is flush with the upper surface of the table 1. The insert is provided with a radial slot or notch 7 which extends through a peripheral edge of the disc for receiving the blade 2. With the slot 7 thus arranged the insert may be removed and replaced as desired.

Underneath the table is a source of light exemplified by an electric lamp 10. This is preferably positioned directly under the insert after the manner illustrated in Fig. 2. The light from this source may pass upwardly through the insert.

The work piece rests upon the table as illustrated at 11 and is to be manipulated relative to the blade for the cutting of the same. Such a work piece is demonstrated in Fig. 3 and shown on a work piece is a reproduction of a machine. Of course, this reproduction may be that of any machine or other device intended to utilize space in a plant, building or other area. This reproduction is generally illustrated at 12 and is to be cut from the work piece 11 by the saw. It will be observed that the representation 12, which may be called a template, shows the outline of the machine and carries suitable indicia thereon which may include the name of the machine or parts thereof together with a number and other indicia which may indicate the type of service the machine requires. As mentioned above the work piece 11 is a relatively thick sheet of material which is translucent or transparent so that it is self-shape retaining.

The operator may look down upon the work and may view the arrangement substantially as illustrated in Fig. 3. The outline of the template is clearly visible because the light shines through the work piece and moreover the cutting edge of the saw is visible. Still further the relative position of the blade, and particularly its cutting edge, and any portion of the contour of the template upon which the blade is working is obtained with accuracy. Accordingly, the templates may be cut from the work pieces with great accuracy. While only one representation of a work piece is illustrated in Fig. 3, it will be understood that a relatively large work piece may have several photographic reproductions thereon so that each constitutes a template showing some sort of a machine when cut therefrom. When the template is cut from the sheet it may be used together with other templates and maneuvered over a drawing or diagram of the area involved in the making of what is termed a plant layout.

In the above disclosure, it has been specified that the insert in the table and the work piece are transparent or translucent. The invention applies to both cases so long as the light may pass upwardly through the table insert and the work piece to a degree necessary for showing the operator the relative positions of the parts. Due to the fact that the material used, which is preferably plastic, both in the work piece and in the table insert is probably, in most instances, not truly transparent; the appended claims, for brevity, will only employ the term translucent. Even though the table insert may be originally transparent or substantially so, it may, in use, become scratched or marred so that after a while it is translucent only. Furthermore, the film on the work sheet 11 may render that sheet translucent where it otherwise might be transparent. The invention is also applicable to a machine where the blade 2 has a reciprocatory motion for cutting purposes, such for example, as the commonly termed "jigsaw," since, in this case, the saw blade extends through the table and has movement for cutting purposes.

I claim:

1. A machine for cutting templates representative of machines or other items of equipment from translucent work pieces which have the representations of machines or other items of equipment thereon, which comprises a supporting table, a band saw extending through the table, an insert in the table through which the blade extends, said insert being of translucent material and light source means positioned under the table for directing rays upwardly through the insert and through the work piece whereby the operator may readily see the operation of the blade in cutting the template from the work piece.

2. A machine for cutting templates representative of machines or other items of equipment from translucent work pieces which have the representations of machines or other items of equipment thereon, which comprises a supporting table, a vertically disposed cutting blade extending through the table, an insert in the table through which the blade extends, said insert being of translucent material and light source means positioned under the table for directing rays upwardly through the insert and through the work piece whereby the operator may readily see the operation of the blade in cutting the template from the work piece.

3. A machine for cutting templates representative of machines or other items of equipment from translucent work pieces which have the representations of machines or other items of equipment thereon, which comprises, a supporting table, a vertically disposed cutting blade extending through the table and movable relative thereto for cutting purposes, the table being adapted to support the work piece, an insert in the table positioned to underlie the work piece at the location of the cutting blade, said insert being of translucent material, and light source means positioned under the table for directing rays upwardly through the insert and through the work piece whereby the operator may readily see the operation of the blade in its cutting of the representation of the machine or other item of equipment from the work piece so that the template may be accurately cut therefrom.

JOHN H. HILL.

REFERENCES CITED

The following references are of record in the file of this patent:

UNITED STATES PATENTS

| Number | Name | Date |
| --- | --- | --- |
| 1,267,055 | Cathcart | May 21, 1918 |
| 1,299,969 | Lewis | Apr. 8, 1919 |
| 2,131,601 | Taub | Sept. 27, 1938 |